Z. PERLIN.
HOUSEHOLD HEATING DEVICE.
APPLICATION FILED MAR. 27, 1916.
1,222,578.
Patented Apr. 10, 1917.
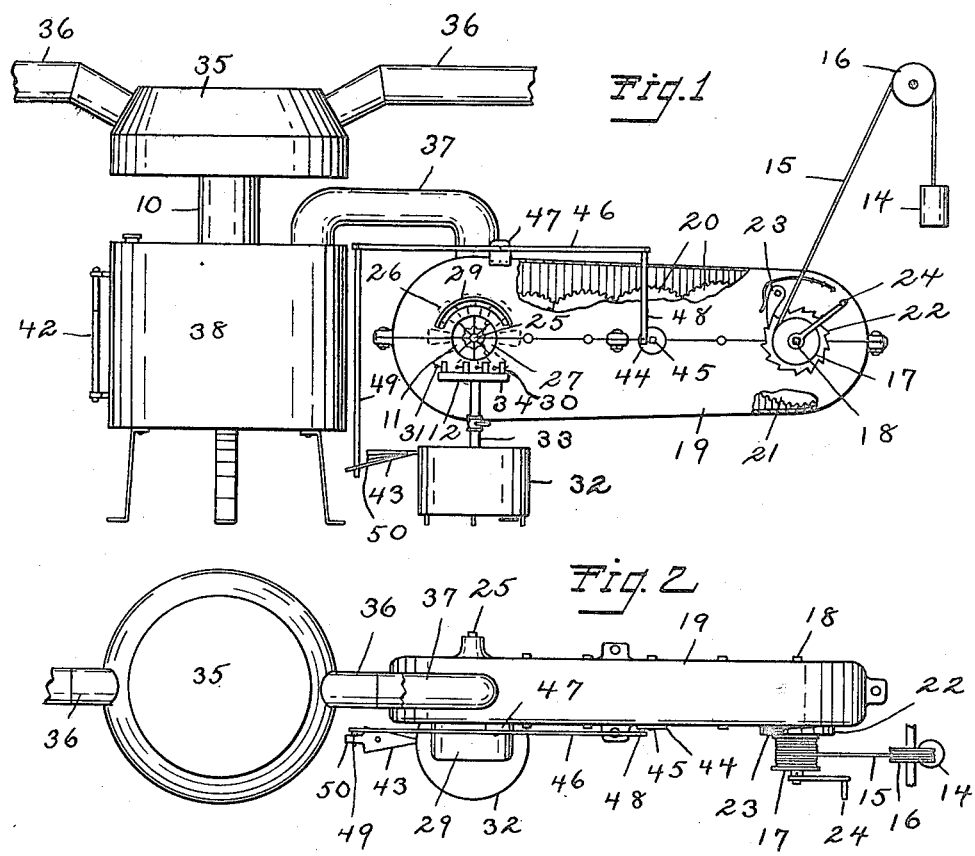
Inventor:
Zodeck Perlin.
By Louis M. Schmidt.
Atty.

UNITED STATES PATENT OFFICE.

ZODECK PERLIN, OF MIDDLETOWN, CONNECTICUT, ASSIGNOR OF ONE-HALF TO THE MATTES PLUMBING COMPANY, OF MIDDLETOWN, CONNECTICUT, A COPARTNERSHIP COMPOSED OF JACOB MATTES AND SAMUEL MATTES, BOTH OF SAID MIDDLETOWN.

HOUSEHOLD HEATING DEVICE.

1,222,578. Specification of Letters Patent. Patented Apr. 10, 1917.

Application filed March 27, 1916. Serial No. 87,033.

*To all whom it may concern:*

Be it known that I, ZODECK PERLIN, a citizen of the United States, residing at Middletown, in the county of Middlesex and State of Connecticut, have invented certain new and useful Improvements in Household Heating Devices, of which the following is a specification.

My invention relates to improvements in household heating devices, and the object of my improvement is to produce a device for heating houses suitable for using gas or gasolene for fuel, involving simplicity and economy in construction and convenience and efficiency in use.

In the accompanying drawing:—

Figure 1 is a side elevation of my improved household heating device.

Fig. 2 is a plan view of the same.

My improved household heating device comprises a distributer 35 for delivering heated air to a set of delivery pipes 36 and connected by a pipe 10 to a water chamber 38, a blower 11 inclosed in a suitable casing 19, connected to the water chamber 38 by a pipe 37, and having an inlet opening 27, a heating apparatus 12 positioned adjacent the opening 27, and operating mechanism for operating the blower.

The operating mechanism as shown comprises a weight 14 connected to one end of a cord or cable 15, that passes over a suitable guide pulley 16, the other end of the cord 15 being connected to a drum 17, mounted on a shaft 18.

The shaft 18 is supported by the walls of the casing 19 that incloses the blower 11 and a set of gearing 20 serves to connect the said blower 11 and the drum 17 in a manner to be described. The shaft 18 extends through the casing 19, and has a gear wheel 21 loosely mounted thereon and housed within the casing 19, the drum 17 being outside the casing 19, and rigidly mounted on a projecting end of the shaft 18. A ratchet 22 and pawl 23 operatively connect the drum 17 and the shaft 18 and the gear 21 mounted thereon, and permit the winding up of the weight 14 by means of a crank 24 on the free end of the shaft 18.

The blower 11 is mounted on the shaft 25 and the gearing 20 consists of a train of gear wheels that serves to materially increase the speed of the blower 11 relatively to the drum 17. The blower 11 comprises a plurality of radial fan blades 26 of ordinary form, the inlet 27 being in the casing 19 in line with the shaft 25 that supports the blower 11, the outlet being in the top wall of the casing 19.

The heating apparatus 12 is positioned so as to deliver the heat opposite the inlet 27 and the casing 19 may be provided with a deflecting roof 29 over the said inlet 27 as shown, the form of heat supplied being a plurality of jets 30 for a hydrocarbon flame, each of which jets 30 is provided with its individual shut-off 31. As shown the jets 30 are supplied with gasolene vapor from a tank 32 by means of a supply pipe 33, that leads to a header 34 from which the jets 30 project.

The distributer 35 is in the form of a delivery drum and as mentioned is connected to a plurality of branch pipes 36 that lead to different parts of the house to be heated. Between the casing 19 and the delivery drum 35 there is provided a water chamber 38. The said water chamber 38 comprises a closed chamber, suitable for containing a supply of water, and having in the roof portion an opening that serves as an air inlet for the delivery pipe 37 extending from the blower 11, and a second opening that serves as the delivery opening and is connected by the pipe 10 with the delivery drum 35. Thus the heated air comes in contact with the surface of the water in the water chamber 38 in its passage from the blower 11 to the final delivery pipes 36, and the same will pick up sufficient moisture to relieve the dryness of the heated air.

A gage glass 42 on the water chamber 38 is used to show the height of the water therein.

I find that by having the drum shaft make about two and one-half revolutions per hour and interconnecting gearing to give the blower a speed of about 600 revolutions per minute and with a drum diameter of three inches the weight would require winding several times a day to permit the device to be kept in operation in an ordinary cellar. To make the time between windings longer a hole could be provided in the cellar floor for housing the weight.

The blower would be operated continuously, and in the summer could be operated for circulating fresh and in some cases cooled air. The heat can be regulated by means of the jets, which can be regulated in the usual manner, and the number kept lighted can be changed as desired.

A bellows 43 is used to force air into the gasolene supply tank 32 and is operated by means of a crank 44 on an extension 45 of one of the several shafts that support the different gears of the gearing 20, the interconnecting means comprising a lever or walking beam 46 operatively supported by a standard 47 attached to the casing 19, and a connecting rod 48 connecting the same with the crank 44 and a second connecting rod 49 for connecting the oscillating arm 50 of the bellows 43.

I claim as my invention:—

1. A household heating device comprising in combination a casing having an opening in the side wall, a blower housed in the said casing adjacent the said opening, a water chamber connected to the said casing, a delivery drum connected to the said water chamber, means for operating the said blower, and an open flame heating apparatus positioned adjacent the said opening, on the outer side of the said casing, and suitable for heating directly air admitted to the said opening.

2. A household heating device comprising in combination a flame heating apparatus, a blower positioned to receive air heated by the said apparatus, a water chamber, a distributer connected to the said water chamber and also communicating with the said blower, a weight, and suitable mechanism for operatively connecting the said weight to the said blower.

ZODECK PERLIN.

Witnesses:
BERTRAND E. SPENCER,
FREDERICK P. BURR.

Copies of this patent may be obtained for five cents each, by addressing the "Commissioner of Patents, Washington, D. C."